United States Patent [19]

Takeda et al.

[11] Patent Number: 4,943,129

[45] Date of Patent: Jul. 24, 1990

[54] TAPERED OPTICAL WAVEGUIDE, WAVEGUIDE TYPE OPTICAL HEAD USING SAME AND OPTICAL WAVEGUIDE

[75] Inventors: Tadashi Takeda, Komagane; Noboru Ueno, Suwa; Yasumitsu Miyazaki, Nagoya, all of Japan

[73] Assignee: Kabushiki Kaisha Sankyo Seiki Seisakusho, Nagano, Japan

[21] Appl. No.: 331,633

[22] Filed: Mar. 30, 1989

[30] Foreign Application Priority Data

Mar. 31, 1988 [JP] Japan ............................. 63-79854
Mar. 31, 1988 [JP] Japan ............................. 63-79855

[51] Int. Cl.$^5$ ............................................. G02B 6/12
[52] U.S. Cl. ............................ 350/96.12; 350/96.15; 350/96.18
[58] Field of Search ............... 350/96.11, 96.12, 96.13, 350/96.14, 96.15, 96.17, 96.18

[56] References Cited

U.S. PATENT DOCUMENTS

| | | | |
|---|---|---|---|
| 4,006,964 | 2/1977 | Mahlein et al. | 350/96.12 X |
| 4,262,993 | 4/1981 | Burns et al. | 350/96.14 |
| 4,372,641 | 2/1983 | Johnson et al. | 350/96.12 |
| 4,445,759 | 5/1984 | Valette | 350/96.12 |
| 4,652,290 | 3/1987 | Cho et al. | 350/96.12 X |

OTHER PUBLICATIONS

R. Ulrich et al., "Geometrical Optics in Thin Film Light Guides", Applied Optics, vol. 1D, No. 9, Sep. '71, pp. 2077-2085.

*Primary Examiner*—John D. Lee
*Attorney, Agent, or Firm*—Flynn, Thiel, Boutell & Tanis

[57] ABSTRACT

A tapered optical waveguide is disclosed, which comprises a substrate having a plane surface for forming a waveguide layer, whose refractive index is higher than that of the substrate, which substrate is transparent with respect to guided light, and a waveguide layer formed on the plane surface of the substrate, in which light taken out on the substrate side is focused so as to form a small spot at a position distant from the interface between the waveguide layer and the substrate.

14 Claims, 14 Drawing Sheets

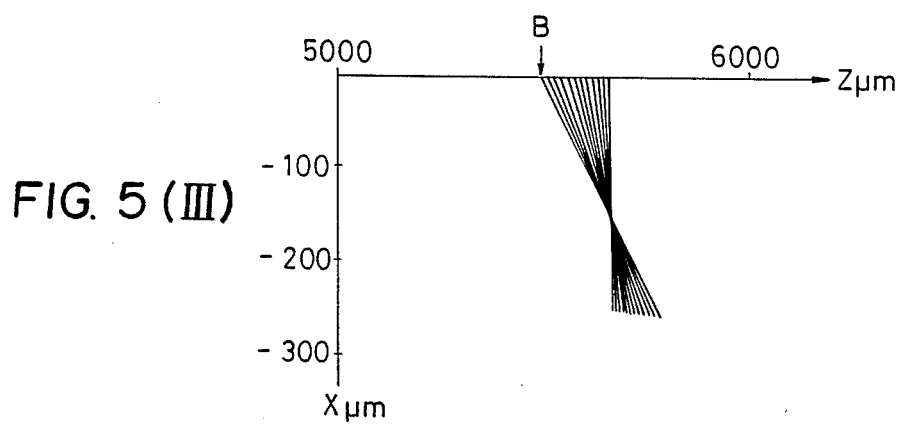
FIG. 5(III)

FIG. 18 (III)

FIG. 18 (IV)

TAPERED OPTICAL WAVEGUIDE, WAVEGUIDE TYPE OPTICAL HEAD USING SAME AND OPTICAL WAVEGUIDE

FIELD OF THE INVENTION

This invention relates to a tapered optical waveguide, a waveguide type optical head formed by using the tapered optical waveguide and effecting recording/reproducing signals on and from an optical disc, and an optical waveguide provided with a substrate structure, which can be applied not only to the tapered optical waveguide but also to optical integrated circuits, etc.

BACKGROUND OF THE INVENTION

A tapered optical waveguide, in which an end portion of a waveguide layer formed on a substrate is tapered, is known (e.g. JP-A-60-78406). In such a tapered optical waveguide, guided light beam propagating in a waveguide layer having a uniform layer thickness is taken out towards the substrate at the tapered portion and it is known that the light beam thus taken out is divergent.

Therefore, if it were possible to change the diverging light beam taken out from the tapered optical waveguide towards the substrate into converging one so as to form an extremely small focus, it would be expected to use it e.g. as an illuminating spot for recording/reproducing information on and from an optical disc.

A structure utilizing a waveguide in an optical head used for recording/reproducing optical disc signals is known, in which a diffraction grating for optical coupling is formed on a plate type optical waveguide (JP-A-61-236037). Since in this type of optical heads a diffraction grating is used for taking out light to the exterior thereof or introducing reflected light in the optical waveguide, it has problems that e.g. light utilization effiency for the illumination on the optical disc is low, because the guided light is diffracted on both the sides of the diffraction grating, that it is difficult to fabricate the diffractioin grating for the coupling, etc.

On the contrary, the tapered optical waveguide has a high applicability to the optical head described above, because the light utilization efficiency thereof is high and its fabrication is easy owing to the fact that emission characteristics of the light taken out towards the substrate side are stable with respect to variations in wavelength of the light source and further substantially all of the emitted light can be taken out towards the substrate side, as described later.

However, even if it is possible to converge the emitted light beam so as to obtain an extremely small focus by designing suitably the tapered shape as described previously, if the focus is located in the closest neighborhood of the interface between the substrate and the waveguide layer, the light beam is divergent in the state where it is really taken out outside of the substrate and it is not possible to utilize directly the focus of the light beam thus taken out for the purpose of the illumination for the recording/reproduction of information from and on the optical disc.

Furthermore it may be required to form a substrate not only for the tapered optical waveguide but also for light integrated circuits, etc. consisting of regions having different refractive indices, as described later. In this case, if it is formed only by joining two substrates having different refractive indices by means of optical resin, a problem is produced that scattering, etc. of the guided light is generated at the joint portion.

OBJECT OF THE INVENTION

This invention has been done, taking the circumstances described above into account, and an object thereof is to provide a tapered optical waveguide capable of converging the light beam taken out towards the substrate side so as to form an extremely small focus at a position distant from the interface described above.

Another object of this invention is to provide a waveguide type optical head using the tapered optical waveguide described above.

Still another object of this invention is to provide an optical waveguide giving rise to no scattering, deformation, etc., which can be applied to a tapered optical waveguide, a light integrated circuit, etc. provided with a substrate consisting of a plurality of regions having different refractive indices.

SUMMARY OF THE INVENTION

In order to achieve the above objects, a tapered optical waveguide according to this invention consists of a substrate having a plane surface for forming a waveguide layer, whose refractive index is higher than that of the substrate, which substrate is transparent with respect to guided light, and the waveguide layer formed on the plane surface of the substrate described above.

The waveguide layer stated above consists of a uniform thickness waveguide layer having a uniform layer thickness and a tapered waveguide disposed contiguously to this uniform thickness waveguide layer so that the guided light propagating in the uniform thickness waveguide layer is emitted there towards the substrate, which tapered waveguide has the same layer thickness as the uniform thickness waveguide layer at the joint and the thickness of which decreases gradually with increasing distance from the joint.

The substrate described above consists of a propagation substrate and an emission substrate having a common plane surface for forming the waveguide layer and disposed in the order described above in the waveguide direction within the waveguide layer, the refractive index of the emission substrate being greater than that of the propagation substrate.

Further the joint portion described above between the propagation substrate and the emission substrate is located so that it is close to an emission starting position determined by the refractive indices of the propagation substrate and the waveguide layer and the shape of the tapered optical waveguide and that it is not beyond this emission starting position in the waveguide direction.

BRIEF DESCRIPTION OF THE DRAWINGS

FIGS. 9(I) and 9(II) shows concretely another second embodiment representing means for the first problem, which this invention is to solve;

DETAILED DESCRIPTION

Hereinbelow a first concrete embodiment representing means for a first problem, which this invention is to solve, will be explained.

Figure 1:
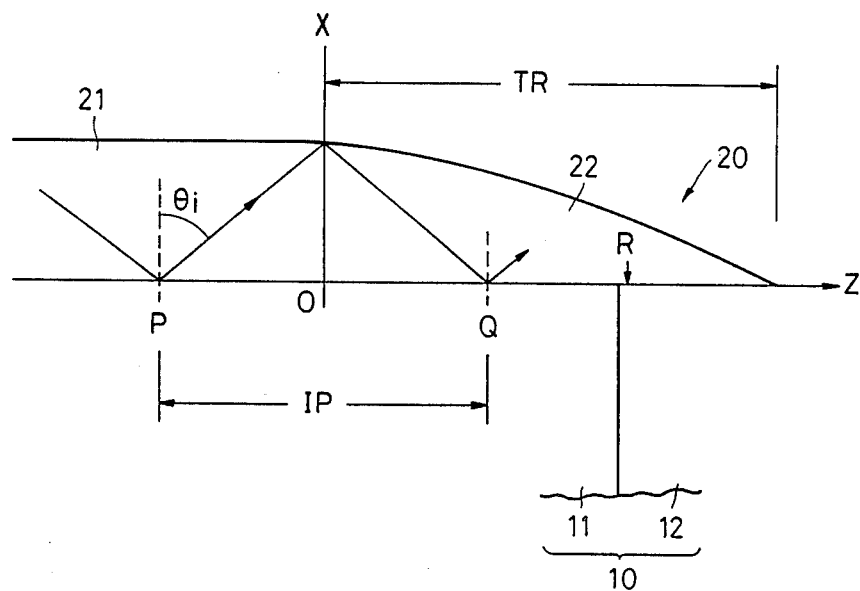
FIGS. 1 to 8 show concretely a first embodiment representing means for a first problem, which this invention is to solve.
Figure 2:
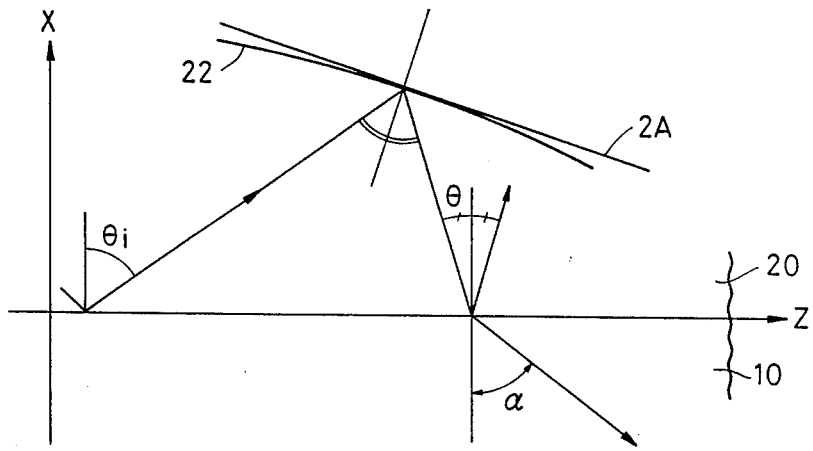

FIG. 1 is a scheme for explaining the embodiment of this invention.

In the figure reference numeral 10 represents a substrate and reference numeral 20 indicates a waveguide layer.

The waveguide layer 20 is composed of a uniform thickness waveguide layer 21 having a uniform layer thickness and a tapered waveguide layer 22.

The substrate 10 consists of a propagation substrate 11 and an emission substrate 12, which are contiguous to each other. Both the propagation substrate 11 and the emission substrate 12 are transparent with respect to the guided light and they have a plane surface in common, on which the waveguide layer is formed. The waveguide layer 20 consisting of the uniform thickness waveguide layer 21 and the tapered waveguide layer 22 is formed on the plane surface described above.

For the purpose of the following explanation X and Z directions are determined as indicated in the figure. The Z direction is in accordance with the plane surface described above of the substrate 10 and corresponds to the propagation direction. That is, the guided light is guided to be propagated towards the right in the uniform thickness waveguide layer 21 in FIG. 1. The X axis is perpendicular to the plane surface described above and the position thereof represents the joint portion between the uniform thickness waveguide layer 21 and the tapered waveguide layer 22. Consequently the tapered waveguide layer 22 is the right part with respect to the X axis in FIG. 1.

The region TR, in which this tapered waveguide layer 22 is formed, is called a tapered region.

The region above the waveguide layer 20 is an air region, which is occupied by air. Concerning the refractive index, e.g. in this embodiment, the refractive indices of the substrate 10 are 1.51 for the propagation substrate 11 and 1.515 for the emission substrate 12; the refractive index of the waveguide layer 20 is 1.52; and the refractive index of air is 1. Consequently the refractive index increases in the order of the air region, the propagation substrate 11, the emission substrate 12 and the waveguide layer 20. Further it is supposed that the uniform thickness waveguide layer 21 is 2.63 $\mu m$ thick; the tapered region is 6000 $\mu m$ long; and the wavelength of the propagated light is 0.6328 $\mu m$ (He-Ne laser light).

The free surface of the tapered waveguide layer 22 (interface between the air region and the tapered waveguide layer 22) is formed so as to be tapered by the fact that the tapered waveguide layer 22 has the same thickness as the uniform thickness waveguide layer 21 at the joint portion and the thickness thereof decreases with increasing distance from the joint portion, as indicated in the figure.

However, although it is called tapered, the inclination thereof is extremely small, because the thickness of the uniform thickness waveguide layer 21 is extremely small with respect to the length of the tapered region.

In the formation of the tapered region TR various tapered shapes can be easily realized by effecting sputtering by the shadow mask sputtering method while moving a mask in the Z direction under the control of the movement speed of the mask.

Hereinbelow the operation of this invention will be explained in conjunction with the embodiment described above.

The wavelength of the light guided to be propagated in the Z direction within the uniform thickness waveguide layer 21 is 0.6328 $\mu m$ and the waveguide mode is $TE_o$ mode representing the fundamental wave. Since it is supposed that the uniform thickness waveguide layer 21 is 2.63 $\mu m$ thick, the effective refractive index at this mode $N=1.5107$. Considering the propagation mode as superposition of plane waves, quasi geometrical optical consideration is effected in order to obtain an asymptotic solution for every elementary wave. That is, plane waves representing elementary waves are treated as an assembly of light beams, each of which propagates in the direction of the normal to each of wave fronts. Using the effective refractive index described above, the incident $TE_o$ mode can be represented by a group of light beams having a propagation angle $\theta_i$ of 86.42°. In the following explanation, unless otherwise indicated, the angle is expressed by the angle formed by the relevant line and the X axis.

The light beam propagating in the uniform thickness waveguide layer 21 propagates in zigzag, while repeating the total reflection at the interface with the substrate 10 and the interface with the air region.

When the light beam propagating in this way enters the tapered waveguide layer 22, since the tangent 2A of the free surface of the tapered waveguide layer 22, i.e. the interface with the air region is inclined with respect to the Z direction, when the light beam totally reflected by the free surface is projected again to the interface with the substrate 10, the incident angle $\theta$ thereof is smaller than the propagation angle $\theta_i$ in the uniform thickness waveguide layer 21. In this way, in the tapered waveguide layer 22, the propagation angle decreases gradually as the reflection is repeated in the tapered region TR.

On the other hand, in this embodiment, the critical angle of the total reflection at the interface between the tapered waveguide layer 22 and the substrate 10 is 83.42° with respect to the propagation substrate 11 and 83.35° with respect to the emission substrate 12. The critical angle of the total reflection at the interface between the tapered waveguide layer 22 and the air region is 41.14°.

Here, if it is supposed for the sake of simplicity that the whole substrate is constructed by the propagation substrate 11, the light beam entering the tapered waveguide layer 22 propagates in zigsag while repeating the reflection. In the meantime the incident angle to the interface with the substrate 10 and the interface with the air region, i.e. the free surface thereof, decreases gradually. At first, when the incident angle on the substrate 10 side decreases below the critical angle 83.35° described above, a part of the light power leaks out to the substrate 10 side. The ratio of the power leaking out at this time depends on the refractive index of the waveguide layer 20, the refractive index of the substrate 10 and the incident angle of the light beam to the reflecting point and it can be calculated by using the relation known as Fresnel's power transmission coefficient. The position where the leak of the power described above begins is the emission starting position.

When the reflection is repeated further and the incident angle to the interface on the air region side decreases below the critical angle 41.14° described above, the light leaks also to the air region. However, from the practical point of view, since the difference in the critical angle of the total reflection between the two interfaces is great, substantially all the light leaks to the substrate side after the point of time where the leak of the light to the substrate side begins and before the point of time where the leak of the light to the air region side begins. Consequently it is not necessary to take the leak of the light to the air region side into account.

Further the direction $\alpha$ of the light leaking to the substrate 10 side can be known by Snell's law on the refraction.

Supposing that the whole substrate is constituted only by the propagation substrate as described previously, the behavior of the light leaking on the substrate side, i.e. the emitted light, was studied as follows.

Refer again to FIG. 1. The light propagating in the uniform thickness waveguide layer 21 propagates uniformly with a propagation angle $\theta_i$ of 86.42°, as described previously. Consequently, when such a light beam enters the tapered waveguide layer 22 at the joint portion on the X axis, the incident light beam has the angle $\theta_i$ everywhere with respect to the X axis. Therefore, at first, considering a light beam, which traverses the joint portion obliquely upward towards the right and enters directly the tapered surface, the entirety of this light is the light, which is reflected by the interface with the substrate 10 between the points O (joint portion.) and P in FIG. 1 and enters the tapered waveguide layer 22. Using the layer thickness of 2.63 μm, the distance between the points O and P is given by;

2.63 μm tan (86.42°)=42.04 μm.

In the same way, the entirety of the light, which traverses the joint portion obliquely downward towards the right and after having being once reflected by the interface with the substrate 10, enters the free surface of the tapered region, is the light, which traverses the X axis between the points O and Q in FIG. 1. The distance between the points O and Q is equal to that described above, i.e. 42.04 μm.

Consequently, if the light reflected upward towards the right with the angle $\theta_i$ by a region indicated by IP in FIG. 1 is considered, all the guided light traversing the joint portion and entering the tapered waveguide layer 22 is taken into account.

Here, a number of light beams totally reflected upward towards the right from this region IP were traced.

Figure 3:
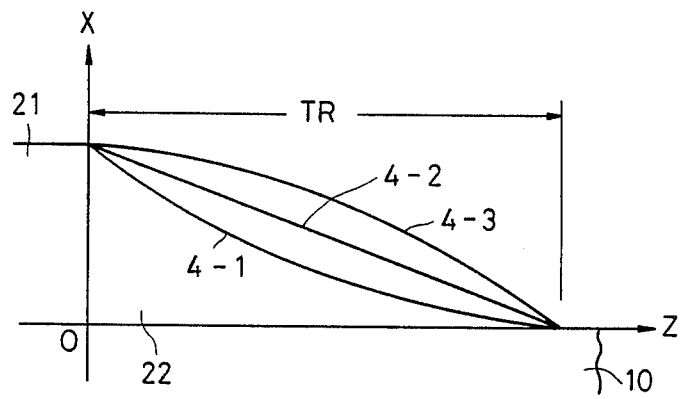

At first, in order to study the effect of the shape of the free surface of the tapered waveguide exerted on the behavior described above, three different shapes, i.e. a concave shape 4-1, a straight shape 4-2 and a convex shape 4-3, as indicated in FIG. 3, were presumed for the free surface. Using a=2.63 μm, b=1/6000 and a parameter c, these shapes can be represented by;

$$X = a\{1 - (b \cdot Z)^c\}. \tag{1}$$

The parameter c is 0.5, 1 and 2 for the concave shape 4-1, the straight shape 4-2 and the convex shape 4-3, respectively. As described in the embodiment, the uniform thickness waveguide layer is 2.63 μm thick and the tapered region is 6000 μm long.

Figure 4:
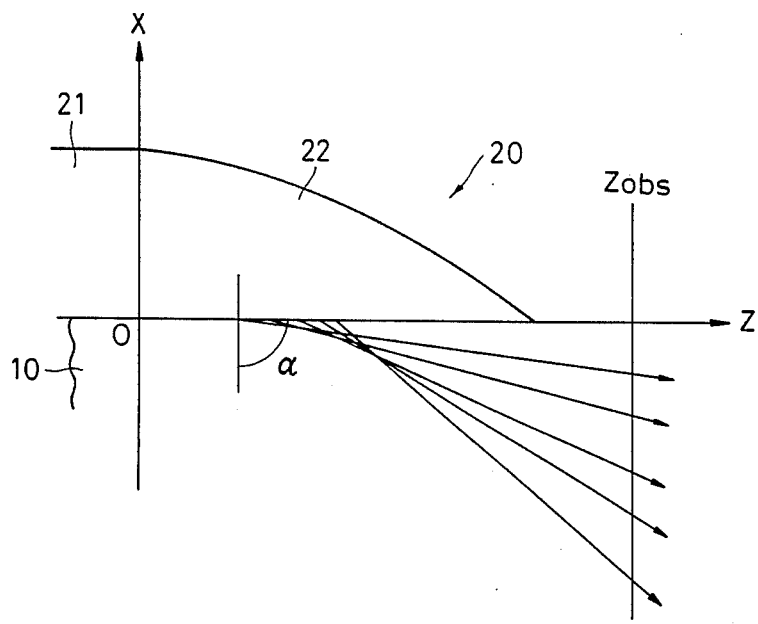

In order to study the behavior of the emitted light leaking out on the substrate side, the degree of concentration of the emitted light beam within the substrate is examined. This degree of concentration is defined as the light beam density as follows. That is, consider a plane $Z_{obs}$ perpendicular to the Z axis, as indictaed in FIG. 4. This plane $Z_{obs}$ is divided into sections, each of which is 2 μm long along the X axis, and the number m of emitted light beams passing through each section is counted. The light beam density D of the emitted light beam is defined as the ratio thereof to the total number $m_T$ of emitted light beams, i.e. $(m/m_T) \equiv D$. Further the section having the highest light beam density is called the highest light beam density position. This is found by shifting the position of the plane $Z_{obs}$ described above with a step of 1 μm in the Z direction. At studying the behavior of the emitted light beam the balance of the power between the waveguide layer and the substrate accompanying the emission is not taken into account, but only the reflected light beam within the waveguide layer and the emitted light beam within the substrate are traced without paying attention to the power thereof. Further the propagation is taken only in the plus direction of the Z axis, i.e. towards the right in FIG. 4, into account. The trace is terminated at the point of time where the incident angle of the reflected light beam to the interface of the substrate side is reduced to $\leq 0$.

Figure 5I:
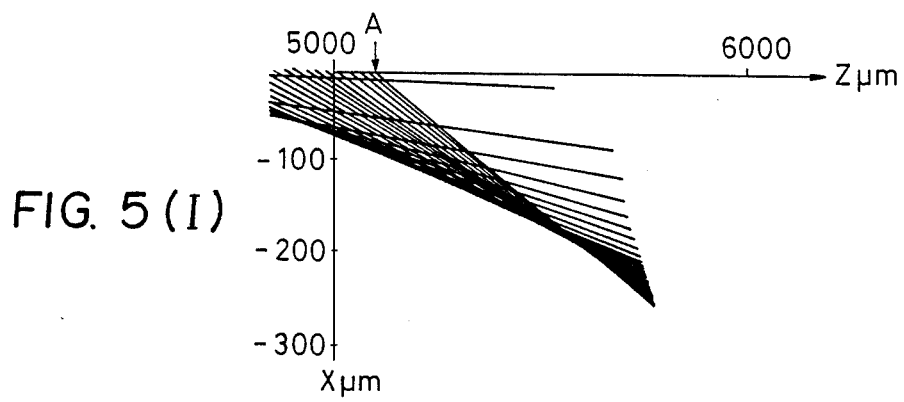
Figure 5:
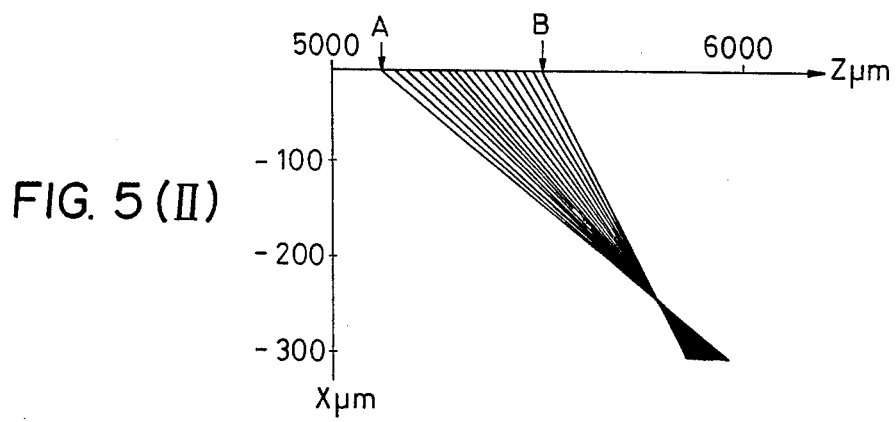

One light beam totally reflected at the position X=Z=0 in the region IP in FIG. 1 was traced by the method described above and the aspect of the number of emitted light beams leaking successively to the substrate side from this one light beam was examined. The result thus obtained is shown in FIGS. 5(I), 5(II) and 5(III). These figures indicate separately a group of emitted light beams (FIG. 5(II)) passing through the highest light beam density position and another group of emitted light beams (FIGS. 5(I) and 5(III)), which don't pass therethrough, for the case where the free surface of the tapered waveguide layer has the convex shape 4-3 (c=2) in FIG. 3. From these figures it can be understood that the behavior is qualitatively always similar, independently of whether the shape of the free surface of the tapered waveguide layer is convex, concave or straight. That is, independently of the shape of the free surface, in general, there are the emission regions emitting the light beams, which don't pass through the highest light beam density position, putting the emission region (region between A and B in FIG. 5(II)) emitting the light beams, which pass through the highest light beam density position, therebetween.

However, examining how the highest light beam density position described above moves, when the incident position, where the incident light beam is projected to the tapered waveguide layer 22, is shifted in the reion IP, for the three sorts of the shape of the surface indicated in FIG. 3, i.e. the concave shape (c=0.5), the straight shape (c=1) and the convex shape (c=2), it is found that in the case where the shape of the free surface described above is concave or straight, the highest light beam density position moves both in the X and the Z directions, when the starting position of the traced light beam moves in the region IP, and on the contrary, in the case where the shape of the free surface is convex, it doesn't move at all and the convergency of the light beam is extremely stable.

Figure 6:
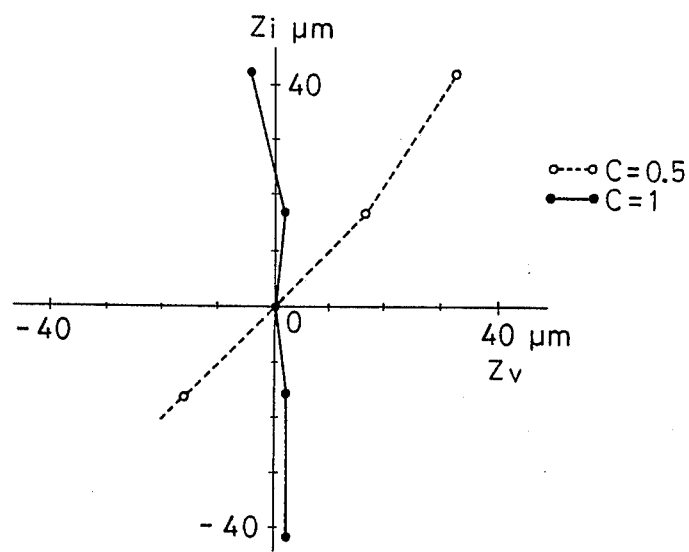
Figure 6:
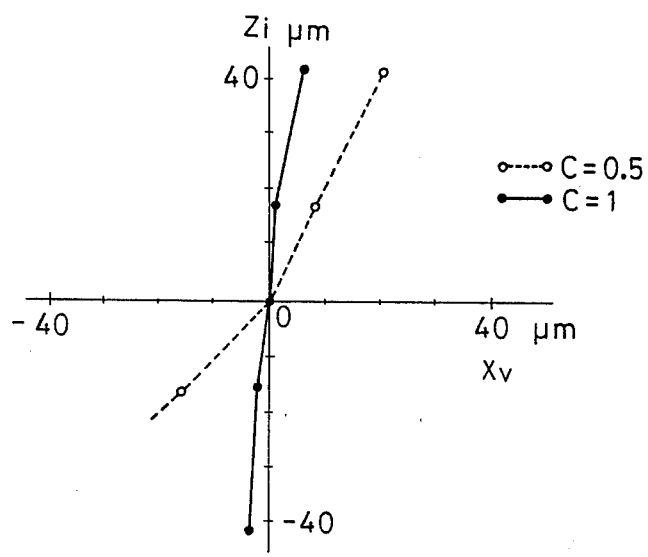

FIGS. 6(I) and 6(II) shows an aspect of variations of the highest light beam density position accompanied by the variations in the starting position of the traced light beam. In FIGS. 6(I) and 6(II) the ordinates $Z_i$ represent the position of the starting position stated above in the Z direction and the abscissas indicate the variations $Z_v$ and $X_v$ in the highest light beam density position in the directions $Z_v$ and X, respectively. The broken lines correspond to the case where the free surface is concave (c=0.5) and the full lines to the case where it is straight (c=1).

In the case where the free surface is convex (c=2), the highest light beam density position doesn't move at all, when the starting point of the traced light beam varies. That is, the behavior of the emitted light is extremely stable with respect to variations of the starting point of the traced light beam. Examining this behavior, it is found that this tendency is valid not only in the case of c=2 but also in the case of c=3, 4, ..., etc. or in the case of convex surfaces expressed by a trigonometrical function, etc.

In the above explanation, as described previously, no attention is paid to the balance of power in the trace of the light beam. However, for the real emission, it is a matter of course that the balance of power should be taken into account. When the balance of power is taken into account, the following problem takes place.

That is, there exists the emission starting position explained previously on the left side of the position indicated by a mark A in FIGS. 5(I) and 5(II). This emission starting position is determined, depending on the refractive indices of the substrate 10 and the waveguide layer 20 as well as the shape of the tapered region. If it can be presumed that the whole substrate 10 is constructed only by the propagation substrate 11, the leak of the light to the substrate side begins at the emission starting position and the amount of this leak is determined by the incident angle to the substrate and the coefficient of reflection. Therefore variations in the power, i.e. in the light intensity, due to this leak are calculated for every emitted light beam by using the Fresnel's power transmission coefficient. Then it is found that all the power of the light, which has propagated in the uniform thickness waveguide layer and is emitted from the tapered waveguide layer to the substrate side, is emitted to the substrate side during a period of time where only about 10 reflections and emissions are repeated after the emission starting position. As the result, for the light projected from the region IP indicated in FIG. 1, the power for each light beam in the waveguide layer is emitted by at most about 10 emitted light beams and these light beams are focused in a relatively small space. FIG. 7(I) indicates approximately this state. As indicated in the figure, the refraction angle, i.e. the emission angle, coming from the neighborhood of the emission starting position is close to 90°. Consequently the concentration of the power accompanying the convergence of the emitted light takes place at a position, which is very close to the interface with the waveguide layer, within the substrate 10. Therefore, in such a case, it is very difficult to set the position, where the power is concentrated, outside of the substrate and finally it is a divergent light beam that can be extracted to the exterior of the substrate.

According to this invention, it was made possible to set the position of the concentration of power of the emitted light beams at a position, which is distant from the interface between the substrate and the waveguide layer, by the fact that the substrate 10 is constructed by the propagation substrate 11 and the emission substrate 12 having a refractive index greater than the former and the joint portion therebetween is located near the emission starting position and so that it is not beyond the emission starting position in the direction of the propagation.

Again referring to FIG. 1, in this embodiment, the free surface of the tapered optical waveguide 22 has the same shape as the convex shape 4-3 in FIG. 3. When a laser light having a wavelength of 0.6328 $\mu$m is propagated in the waveguide layer 20 with the waveguide mode $TE_o$, the position R, where the emission to the substrate side is started, is located at 4058 $\mu$m from the position of Z=0.

Although, in the embodiment, the joint portion between the propagation substrate 11 and the emission substrate 12 is located at a position, which is somewhat deviated towards the X axis side from the emission starting position, since it is the condition that the set position of the joint portion is near the emission starting position and that it is not beyond this emission starting position in the propagation direction, it is possible to set the position of the joint portion near the emission starting position R in a limit of the emission starting position R.

Since the refraction index of the emission substrate 12 is greater than that of the propagation substrate, when the propagated light is reflected in the tapered waveguide layer 22 and enters the emission substrate 12, the emission to the emission substrate 12 is started.

Figure 7:
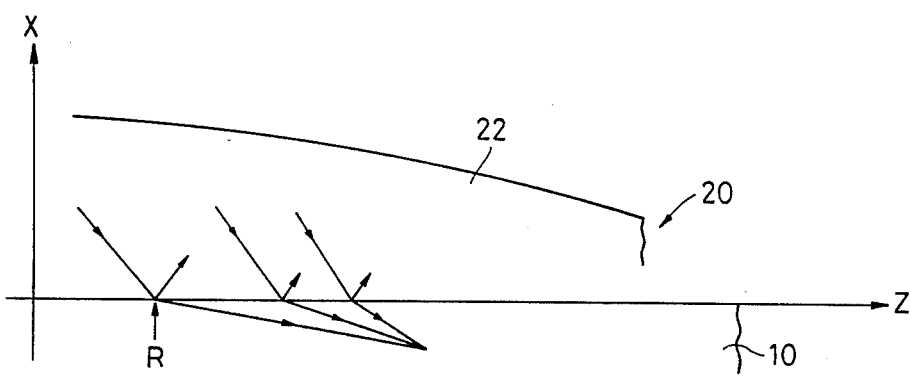
Figure 7:
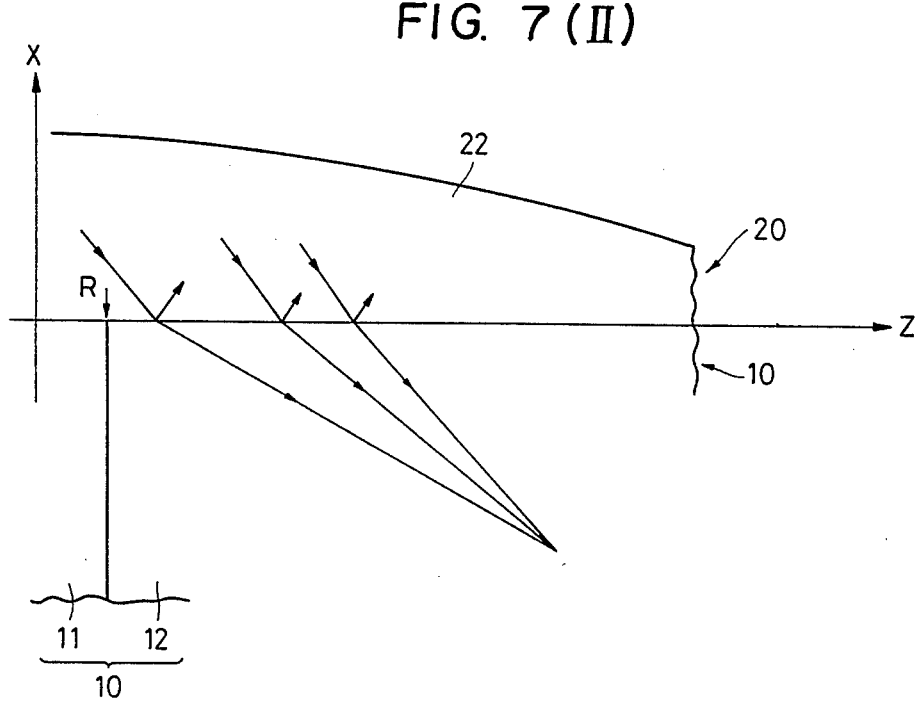

If the whole substrate were constructed only by the propagation substrate, the direction of the emitted light beam emitted at the emission starting position would be closely along the interface between the substrate and the waveguide layer, as described previously, and the concentration of the power would take place extremely closely to the interface stated above (refer to FIG. 7(I)). In the contrary the emission substrate 12 has a refractive index greater than the propagation substrate and consequently it has a small difference in the refractive index with respect to the waveguide layer. For this reason the refraction angle, i.e. the emission angle, of the emitted light beam leaking towards the emission substrate 12 is smaller than that of the light beam emitted towards the propagation substrate at the emission starting position and therefore the direction of the emitted light beam has a large angle with respect to the interface stated above, as indicated in FIG. 7(II). Further the position, where the power is concentrated by the intersection of the emitted light beams, is located at a position, which is distant from the interface stated above. Consequently it is possible to concentrate really the power of the emitted light beams outside of the substrate. Furthermore, since the emission towards the emission substrate 12 begins at the neighborhood of the emission starting position, in this state the interval between positions, where emitted light beams adjacent to each other are emitted, is relatively large and consequently it is possible to focus emitted light beams coming from a relatively wide region.

Figure 8:
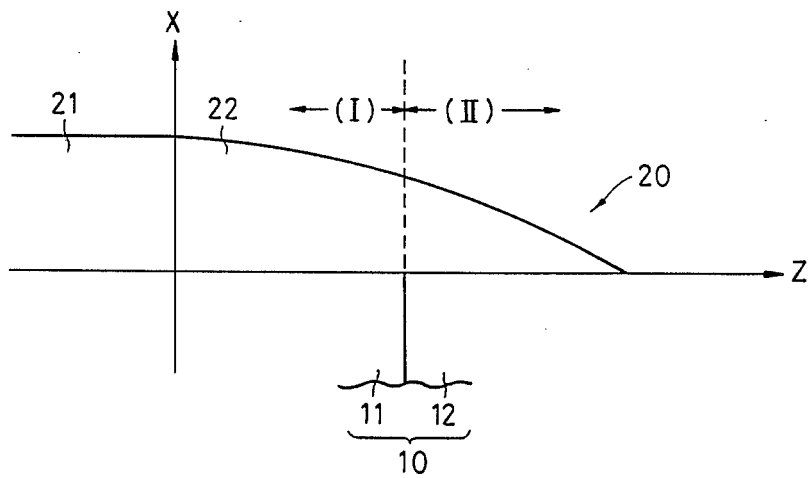

The essential point of this invention consists in that the propagation angle is varied in the region I; the emission is started in the region II, as indicated in FIG. 8; in order to reduce the emission angle at that time, an emission substrate having a small difference in the refraction index with respect to the waveguide layer is used for the region II; and in this way the position of the concentration of power is located at a position distant from the surface of the substrate by taking out the power by emitted light beams forming large angles with respect to the surface of the substrate.

Further, although in the above example, it is supposed that the free surface of the tapered waveguide layer has a convex shape, this invention is not restricted thereto. However, when a convex shaped free surface is used, the position of the concentration of power is stabilized.

In the tapered optical waveguide explained above, since the substrate is constructed by the propagation substrate and the emission substrate having a refractive index greater than that of the former and emitted light beams having small emission angles are taken out in the substrate, the power of the guided light can be located at a position, which is distant from the interface between the substrate and the waveguide layer. Furthermore it is possible to improve the stability of the concentration of the power by forming the free surface of the tapered optical waveguide in a convex shape.

Next another concrete embodiment representing means for the first problem, which this invention is to solve, similarly to the tapered optical waveguide described above, will be explained.

Figure 9:
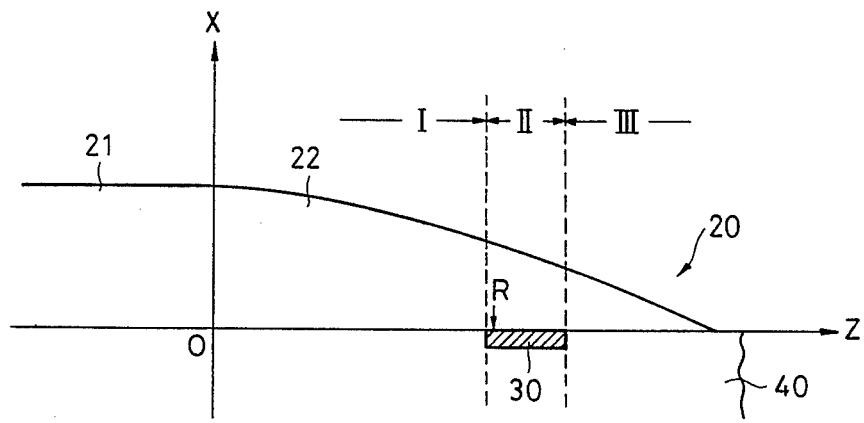
Figure 9:
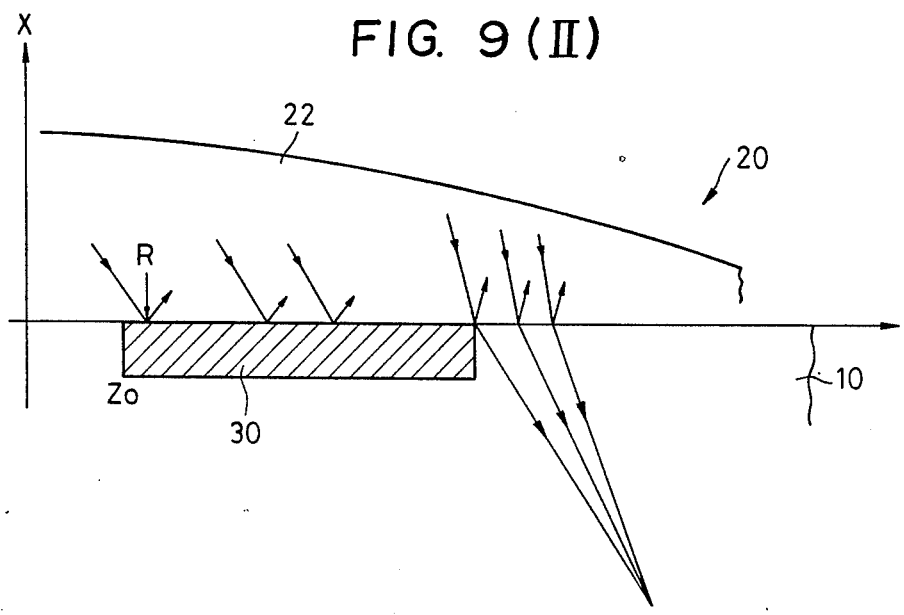

FIGS. 9(I) and 9(II) are schemes for explaining the embodiment of the tapered optical waveguide.

In FIGS. 9(I) and 9(II), this tapered optical waveguide has a substrate 10, a waveguide layer 20 and a clad layer 30. The substrate 10 stated above has a plane surface for forming the waveguide layer and a refractive index, which is smaller than that of the waveguide layer 20, and it is transparent with respect to the guided wave.

The waveguide layer 20 stated above is formed on this substrate 10 and the clad layer 30 is buried in the substrate 10 under the plane surface for forming the waveguide layer. Further the waveguide layer 20 consists of a uniform thickness waveguide layer 21 having a uniform layer thickness and a tapered waveguide layer 22 jointed with the uniform thickness waveguide layer 21, which has the same thickness as the uniform thickness waveguide layer 21 at the joint portion, the thickness described above decreasing gradually with increasing distance from the joint portion stated above, and emits the guided light propagated in the uniform thickness waveguide layer 21 to the substrate side.

The clad layer 30 is disposed so as to include the position R, where the emission towards the substrate is started, which is determined by the shape of the tapered waveguide layer 22 as well as the refractive indices of the waveguide layer 20 and the substrate 10.

Further the clad layer 30 is disposed in order to prevent the leak of the light from the tapered waveguide layer 22 at this clad layer portion by the total reflection and the refractive index thereof is lower than that of the substrate 10.

Furthermore the free surface of the tapered waveguide layer 22 of the waveguide layer 20 may have a convex shape protruding from the substrate 10 stated above.

In the tapered optical waveguide constructed as described above, since the waveguide layer 20' is constructed in the same manner as the tapered waveguide indicated previously in FIGS. 1 to 8, the operation and the effect thereof are identical to those described previously. The difference from the tapered optical waveguide described previously consists in that the clad layer 30 is disposed in the substrate 10 as means for limiting the emission starting position R of the emitted light beam.

That is, if there were no clad layer 30 at this portion, the leak of the light would be started at the emission starting position R. However, since the clad layer 30 having a refractive index smaller than that of the substrate 10 is disposed so as to include the emission starting position R, the light beam, which would begin the emission at the position R, if there were no clad layer 30, repeats further the total reflection at this clad layer portion. Therefore the substantial emission starting position is shifted to the right end portion of the clad layer 30, as indicated in FIG. 9(II). Consequently, when the emission is started in reality at this position, the incident angle of the light beam projected to the substrate within the tapered waveguide layer can be sufficiently small. As the result, the emission angle is also small and the direction of each of the emitted light beams forms a large angle with the interface between the substrate 10 and the waveguide layer 20. At the same time the emitted light beams are parallel to each other. Therefore the position, where the power is concentrated, is located away from the interface stated above and thus it is possible to concentrate really the power of the emitted light beams outside of the substrate.

Consequently the essential point of this tapered optical waveguide consists in that, as indicated in FIGS. 9(I) and 9(II), in the region I of the tapered optical waveguide 22 the propagation is varied; in the region II the emission of the emitted light beams close to and along the surface of the substrate is effectively restricted; and in the region III the position of the concentration of the power is made distant from the surface of the substrate by taking out the power by the emitted light beams forming a large angle with the surface of the substrate.

Since in the tapered waveguide indicated in FIGS. 9(I) and 9(II), which is provided with the clad layer 30, the emission starting position of the emitted light beam can be regulated by means of this clad layer 30, it is possible to locate the power of the guided wave at a position distant from the interface between the substrate 10 and the waveguide layer 20 and further by forming the free surface of the tapered waveguide layer 22 in a convex shape it is possible to improve the stability of the concentration of the power.

Figure 10:
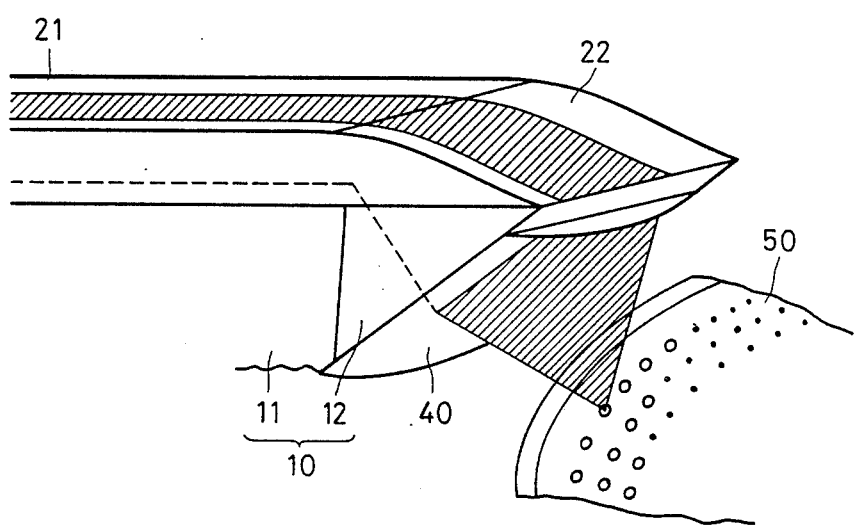
FIG. 10 shows concretely a first embodiment representing means for a second problem, which this invention is to solve.

Next another embodiment, which is means for the second technical problem, which this invention is to solve, will be explained. FIG. 10 shows an example of the case where the tapered optical waveguide layer explained, referring to FIGS. 1 to 8, is used in a waveguide type optical head and FIG. 11 shows an example of the case where the tapered optical waveguide layer explained, referring to FIGS. 9(I) and 9(II), is used in a waveguide type optical head.

Figure 11:
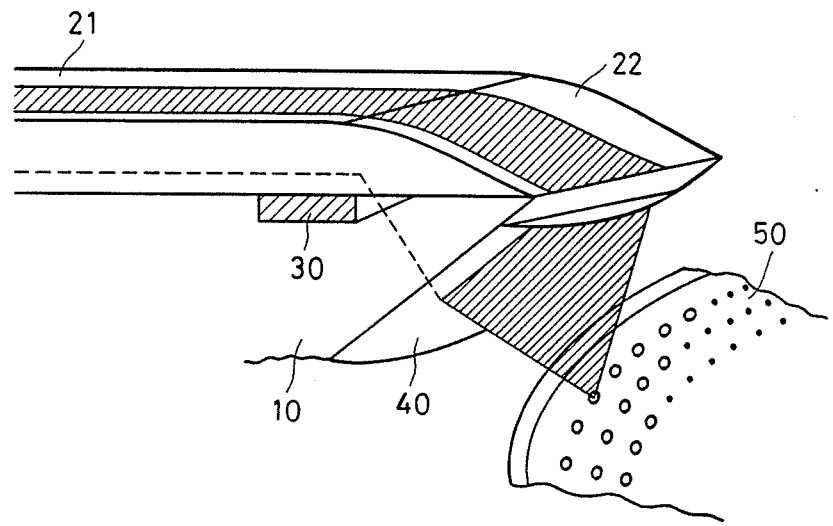
FIG. 11 shows concretely another second embodiment representing means for the second problem, which this invention is to solve.

As indicated in FIGS. 10 and 11, in the case where either one of the tapered optical waveguides is used, since the light beam taken out towards the substrate 10 side is not convergent in the width direction of the waveguide layer 20, in order to converge the light beam taken out towards the substrate side so as to form a small spot, e.g. a cylindrical lens 40 is used in the form of an anamorphic optical system so that this cylindrical lens 40 can have a converging property in the width direction of the waveguide layer.

However, for mounting a lens as described above on the outside of the waveguide layer complicated alignment of the optical axis, regulation of the gap between the substrate and the lens, etc. are necessary.

Therefore, according to this invention an improved waveguide type optical head is provided, in which there is disposed a lens portion (waveguide lens) on the waveguide layer in the tapered optical waveguide described previously, which lens portion has a converging action in the width direction of the waveguide layer, so as to converge the light beam emitted from the waveguide layer towards the substrate side outside of the substrate by means of the lens portion and the tapered waveguide layer 22 so that the emitted light beam is converged in the form of a spot on an optical disc, etc.

Figure 12:
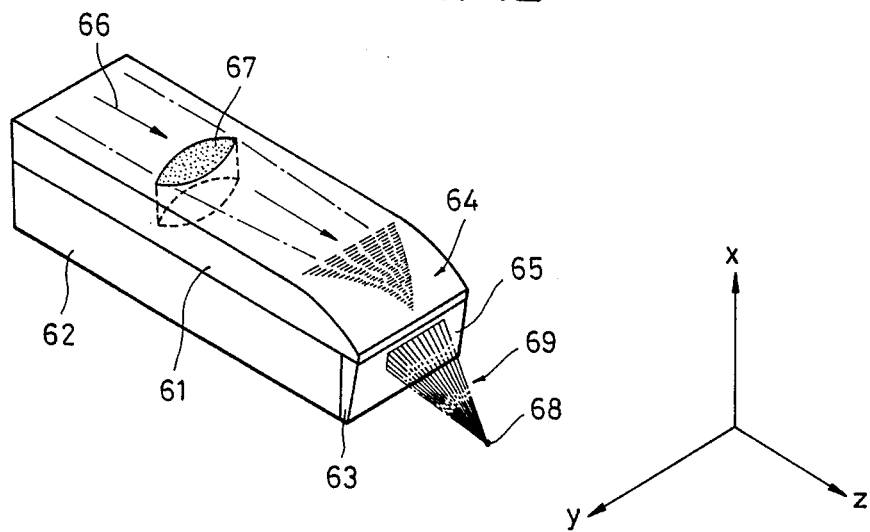
FIGS. 12 to 15 show concretely still another third embodiment representing means for a second problem, which this invention is to solve.

FIG. 12 is a perspective scheme illustrating the construction of the tapered optical waveguide, which is an embodiment of the waveguide type optical pickup head according to this invention.

In the figure reference numeral 61 indicates the waveguide layer, which consists of a uniform thickness waveguide layer and a tapered waveguide layer similar to those in the tapered optical waveguide explained, referring to FIGS. 1 to 8. The uniform thickness waveguide layer is about $\mu$m thick.

Reference numerals 62 and 63 represent a substrate, in which a propagation waveguide 62 and an emission waveguide 63 having a plane surface in common for forming the waveguide layer 61 described above are disposed in this order so as to be contiguous to each other in the waveguide direction. The emission substrate 63 stated above has a refractive index greater than that of the propagation substrate 62. Here, designating the refractive index of the waveguide layer 61 by nf, the refractive index of the propagation substrate 62 by ns and the refractive index of the emission substrate 62 by nc, the following relationship is valid;

nf>nc>ns

Further the joint portion between the propagation substrate 62 and the emission substrate 63 described above is so set that it is close to the emission starting position (refer to the position R in FIG. 7(II)) not shown in the figure, which is determined by the refractive indices of the propagation substrate 62 and the emission substrate 63 as well as the shape of the tapered waveguide layer and that it is not beyond this emission starting position in the waveguide direction.

Figures 13A, 13B, 13C:
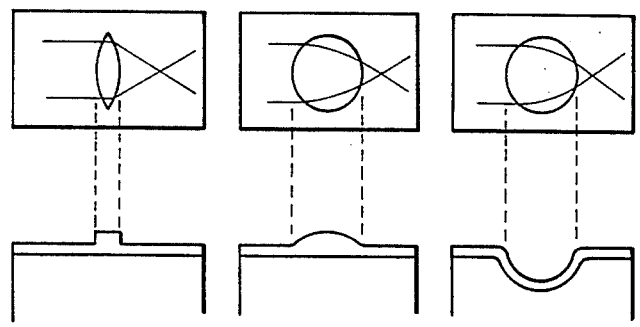
Figure 14A:
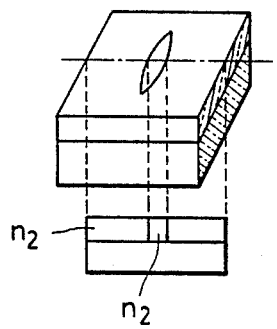
Figure 14B:
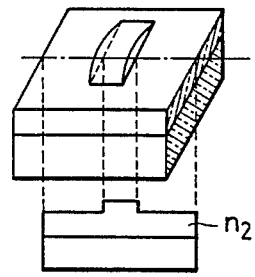

Furthermore reference numeral 67 in FIG. 12 indicates the waveguide lens, which represents the feature of this invention. This waveguide lens 67 is formed in the waveguide layer 61 (either in the uniform thickness waveguide layer or in the part of the tapered waveguide layer before the emission starting position) and it is constructed so as to have the converging action in the width direction (y direction in the figure) of the waveguide layer 61. As this waveguide lens 67, a mode index lens indicated in FIGS. 13(a), 14(a) and 14(b), a Luneberg lens indicated in FIG. 13(b), a geodesic lens indicated in FIG. 13(c), a grating lens indicated in FIG. 15 (Fresnel lens in the example indicated in the figure), etc. may be used.

Since the tapered optical waveguide constructed as described above has the same construction as the tapered optical waveguide explained, referring to FIGS. 1 to 8, it has the same function as the latter. Consequently the feature of this invention consists in that the optical waveguide has the convergency also in the width direction of the waveguide layer 61 by forming a lens having a function equivalent to that of an external lens such as a cylindrical lens, etc. in the waveguide layer 61 in one body.

Now the function of the tapered waveguide indicated in FIG. 12 will be explained.

In FIG. 12, when the laser light is injected in the waveguide layer 61 through a butt joint (a method, by which a semiconductor laser is closely directly stuck to the end surface of the waveguide layer 61), etc., the guided light 66 propagating in the waveguide layer 61 is in $TE_0$ mode, which is the fundamental wave. This guided light 66 of this $TE_0$ mode arrives at the waveguide lens 67, while enlarging gradually the beam width, as it propagates in the waveguide layer 61 in the Z direction in the figure. In the case where a collimate lens is added thereto, a parallel light beam arrives at the waveguide lens 67.

The guided light 66, which has arrived at the waveguide lens 67, is transformed into a convergent light beam converging in the width direction of the waveguide layer 61 by the converging action of the waveguide lens 66, which beam is focused in a focus 68 in air. The waveguide lens 67 has only the converging action in the width direction of the waveguide layer, i.e. in the y direction in the figure.

The guided light 66, which has arrived at the tapered portion 64 of the tapered waveguide layer, while decreasing gradually the beam width, is emitted to the substrate 62, 63 as leaked wave by the action of this tapered portion 64 and further emitted outside of the substrate through the end surface 65 of the emission substrate 63. This emitted light 69 forms a beam having at this time the convergency of the x direction component in this figure by the action of the tapered portion 64 and the action of the substrate 62 and the substrate 63 so as to be focused at the focus 68. Consequently, in the case where the tapered optical waveguide according to this invention, the emitted light, which is emitted to the exterior by the action of the waveguide lens 67, the tapered waveguide and the substrate, is an emitted light beam converged both in the x and in the y directions in the figure, which can forms an extremely small light spot at the focus 68 in air.

Therefore, in the case where the tapered optical waveguide indicated in FIG. 12 is used as a waveguide type optical head, it is sufficient to position an optical disc at the position of the focus 68 and thus it is possible to converge the emitted light 69 on the optical disc so as to form a spot thereon. Further signal light reflected by the optical disc follows the path described above in the reverse direction, propagates again in the waveguide layer 61 in the revere direction, and is detected as a signal. Furthermore it is also possible to form a photodetector, etc. for detecting the signal light within the waveguide layer.

Although, in the tapered optical waveguide indicated in FIG. 12, an example has been shown, in which the waveguide lens is disposed in the waveguide layer of the tapered optical waveguide explained, referring to FIGS. 1 to 8, it is also possible to obtain an action and an effect similar thereto, if the waveguide lens is disposed in the waveguide layer of the tapered optical waveguide having the clad layer indicated in FIG. 9 and to be applied in the same way to a waveguide type optical pickup head.

Figure 16:
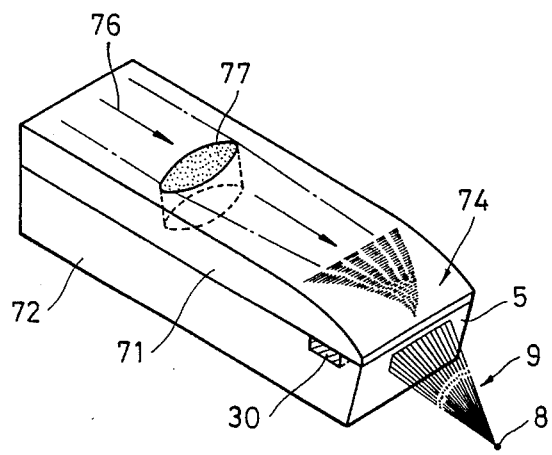
FIG. 16 shows concretely still another fourth embodiment representing means for the second problem, which this invention is to solve.

FIG. 16 is a perspective scheme illustrating the construction of such a waveguide type optical head, which is an embodiment of this invention. This waveguide type optical head has a plane surface for forming the waveguide layer and includes a substrate 72 having a refractive index smaller than that of the waveguide layer and transparent with respect to the guided light, the waveguide layer 71 formed on the plane surface and a clad layer 30 buried in the substrate 72 under the plane surface. The waveguide layer 71 consists of a uniform thickness waveguide layer having a uniform layer thickness and a tapered waveguide layer 74, which are contiguous to each other. The thickness of this tapered waveguide layer is equal to that of the uniform thickness waveguide layer at the joint portion and decreases with increasing distance from the joint portion stated above so that the guided light 76, which has propagated in the uniform thickness waveguide layer, is emitted there towards the substrate 72 side. The clad layer 30 described above has a refractive index smaller than that of the substrate 72 and it is located so as to include the position, where the emission towards the substrate 72 side is started, determined by the shape of the tapered waveguide layer as well as the refractive indices of the waveguide layer 71 and the substrate 72. At the same time the waveguide layer 71 described above is provided with a waveguide lens 77 having the converging action in the width direction of the waveguide layer 71 and so constructed that the emitted light emitted by the tapered waveguide layer 74 towards the substrate 72 side is converged so as to form a small spot on an optical disc outside of the substrate.

Figure 15:
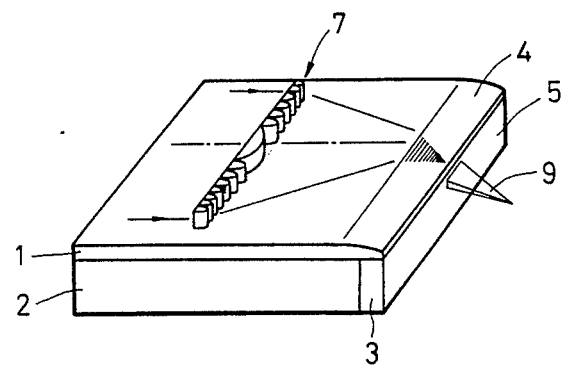

That is, the waveguide type optical head having the construction indicated in FIG. 16 has the convergence also in the width direction of the waveguide layer 20 owing to a waveguide lens 77 indicated previously in FIGS. 13 to 15 disposed within the waveguide layer 20 of the tapered optical waveguide explained, referring to FIG. 9 and it is possible to obtain an action and an effect similar to those of the waveguide optical head indicated in FIG. 12.

Next the third technical problem, which this invention is to solve, and a first embodiment, which is concrete means for solving it, will be explained.

In this tapered optical waveguide the substrate consists of two substrate, propagation substrate and emission substrate, having different refraction indices for focusing the emitted light beam outside of the substrate. For this reason, in order to realize the tapered optical waveguide, it is necessary to dispose more than two regions having different refraction indices in the substrate for the optical waveguide. For this purpose, heretofore, two substrates having different refraction indices were jointed by using optical resin, etc., and thereafter a surface of this jointed substrate was polished so as to obtain the plane surface for forming the waveguide layer.

However, in the case where the substrate having two regions having different refraction indices is fabricated by combining two substrates by means of optical resin, etc., even if there is no step at the interface (joint portion) at the fabrication of the substrate, when excessive heat is added to the substrate e.g. by heating the substrate during the formation of the waveguide layer, deformations take place in the resin portion existing at the joint portion in the substrate. As the result this gave rise to a problem that scattering, etc. of signal light are generated at the joint portion.

Further, in the case where optical resin, etc. is put in the joint portion in the substrate, a polishing step due to a difference in the hardness is apt to be produced at the finishing by polishing of the used surface of the substrate and further abrasive, sludge, etc. enter this intermediate layer. Therefore there was a problem that no surface of the substrate, for which the continuity is desired, can be obtained. Similarly there was another problem that also in the aspect of the quality reliability, resin, etc. are weak in the water-resisting property, the heat-resisting property and the vibration-resisting property as well as in the reliability, because changes of the joint portion with the passage of time are remarkable.

Therefore this invention provides an optical waveguide provided with regions having different refractive indices, in which scattering, strain, deformation, ect. are not produced, and which can be applied not only to the tapered optical waveguide but also widely to general light integrated circuits, etc.

This embodiment will be explained below in detail, referring to FIGS. 17 to 19.

For the optical waveguide according to this invention a substrate for forming the waveguide layer is fabricated at first.

Here the case where the substrate for forming the waveguide layer is formed by using two substrates having different refraction indices will be explained.

Figure 17:
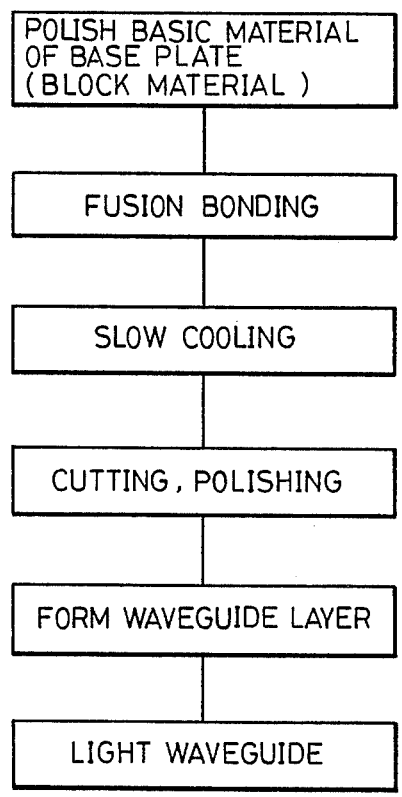
FIGS. 17 to 20 show concretely a first embodiment representing means for a third problem, which this invention is to solve.
Figure 18:
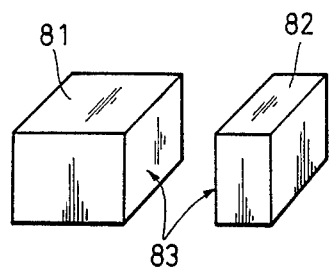
Figure 18:
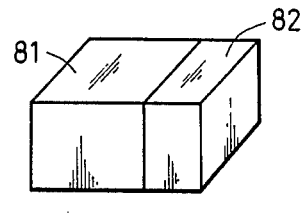
Figure 18:
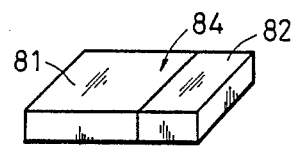
Figure 18:
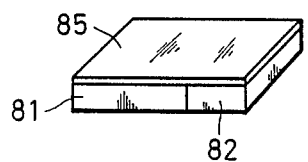

In FIG. 17, at first, as indicated in FIG. 18(I), basic materials of base plate 81, 82 formed in blocks are prepared and the joint surface 83 of each of the basic materials 81, 82 is mirror-polished. Then the basic materials 81, 82 are bonded with each other at their mirror-polished surfaces. The basic materials 81, 82 are heated and held at the glass transition temperature of the materials, which is about $+30°$, in order to bond the basic materials 81, 82 at their joint surfaces by fusion.

After this fusion bonding of the basic materials by heating and holding them at the temperature, they are slowly cooled and thus the bonding of the basic materials 81, 82 is terminated. FIG. 8(II) shows the state after the fusion bonding of the basic materials 81, 82.

Next, as indicated in FIG. 8(III), the basic materials 81, 82 bonded by fusion are cut to a predetermined shape having a given thickness and a substrate for forming the waveguide layer is fabricated by mirror-polishing the surface 84 for forming the waveguide layer. Then, as indicated in FIG. 18(IV), on the surfaces 84 for forming the waveguide layer of the substrate for forming the waveguide layer subjected to the mirror-polishing described above an optical waveguide is formed by depositing a waveguide layer 85 by ion plating, by an evaporation method such as PVD, CVD, etc., by the sputtering method, etc.

At the formation of the waveguide layer described above serving as the optical waveguide the waveguide layer, in which the light beam propagates, should be formed by ion plating, by an evaporation method such as PVD, CVD, etc., by the sputtering method, etc. on the substrate previously prepared. At the formation of this waveguide layer the substrate is heated usually at about 200° C. This heating is effected for the purpose of increasing close adhesion between the material of the waveguide layer and the substrate.

When the substrate is heated for this purpose, in a substrate bonded by using a prior art resin the resin is deteriorated by heat, which gave rise to various sorts of problems. On the contrary, according to this invention, since the bonding of the substrate is effected by means of the fusion bonding by heating at a temperature above the glass transition temperature ($T_g$: 500°~600° C.), the joint portion is stable during the heating at about 200° C. for the formation of the waveguide layer and no variations in dimensions, no steps, etc. take place in the joint portion.

As described above, according to this invention, since the substrate for forming the waveguide layer is fabricated in one body by forming the joint portion 83 between the substrates 81 and 82 having different refractive indices, there exists no optical resin, etc. in the joint portion, scattering loss at the joint surface, thermal deformations of the resin portion under a high temperature, variations of the joint portion with the passage of time, etc. are excluded and thus it is facilitated to fabricate an optical waveguide provided with a substrate consisting of regions having different refractive indices.

Figure 19:
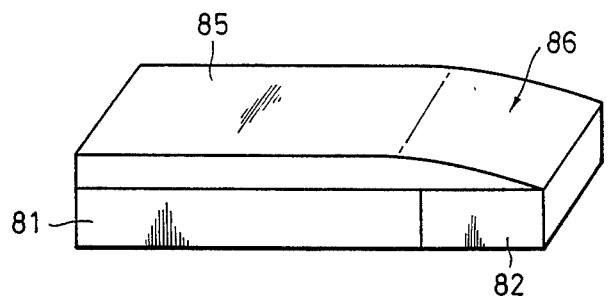

Consequently, according to this invention, as indicated in FIG. 19, even in the case where two substrates 81 and 82 having different refractive indices are bonded and the uniform thickness waveguide layer 85 and the tapered waveguide layer 86 are formed thereon, since the two substrates 81 and 82 having different refractive indices are jointed by fusion bonding and thus problems such as production of steps, light scattering, etc. are prevented, a tapered optical waveguide having good characteristics can be fabricated.

Here, in the tapered optical waveguide indicated in FIG. 19, the waveguide layer 85, 86 consists of the uniform thickness waveguide layer 85 having a uniform layer thickness and the tapered waveguide layer 86 disposed contiguously to the uniform thickness waveguide layer 85, whose thickness is equal to that of the latter at the joint portion and decreases gradually with increasing distance from the joint portion so that the guided light propagating in the uniform thickness waveguide layer 85 is emitted there towards the substrate side. The substrate, on which the waveguide layers 85, 86 are formed by a propagation substrate 81 and an emission substrate 82 having refractive indices different from each other, as stated previously, and having a plane surface in common for forming the waveguide layers 85, 86, which are disposed in this order in the waveguide direction. The joint portion between the propagation substrate 81 and the emission substrate 82 described above is so set that it is close to the emission starting position (refer to the position R in FIG. 7(II)) not shown in the figure, which is determined by the refractive indices of the propagation substrate 81 and the emission substrate 82 as well as the shape of the tapered waveguide layer 86 and that it is not beyond this emission starting position in the waveguide direction.

In the tapered optical waveguide thus formed, the guided light, which ha

Consequently, in the tapered optical waveguide constructed as indicated in FIG. 19, either by adding a cylindrical lens not shown in the figure to the end surface of the emission substrate 82 or by disposing a waveguide lens in either one of the waveguide layer 85 and 86 so as to have the convergency also in the width direction of the waveguide layers, it is possible to focus the emitted light beam so as to form a spot in air outside of the substrate and to use it e.g. as a waveguide type optical head for recording/reproduction information on and from an optical disc.

Figure 20:
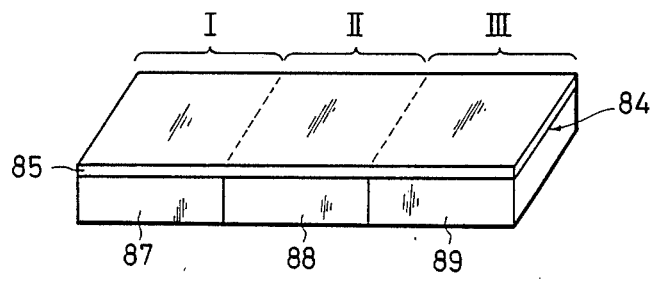

Next FIG. 20 shows another application example of the optical wavguide according to this invention.

Here, since the substrate, on which the waveguide layer 85 is disposed, is formed by fusion-bonding the substrates 87, 88 and 89 having different refraction indices, so as to form a plurality of regions having different refraction indices in the substrate for forming the waveguide layer, it is possible to construct an optical waveguide having multiple functions (so-called light integrated circuit).

As explained above, according to this invention, it is possible to fabricate easily an optical waveguide provided with a substrate having a plurality of regions having different refraction indices and further to apply it to a waveguide type optical head, a light integrated circuit, etc.

Furthermore it is possible to provide an optical waveguide, for which the problems such as light scattering at the interface between regions having different refraction indices are produced.

In addition, since the surface of the substrate for forming the waveguide layer can be a surface mirror-polished with a high precision, the formation of the tapered waveguide layer, etc. is easy and thus it is possible to fabricate a tapered waveguide having a high quality.

Still further, since the substrate for forming the waveguide layer is fabricated by fusion-bonding without using any adhesive such as resin, etc., it is possible to provide an optical waveguide, which is strong in the heat-resisting property, the water-resisting property and the vibrations-resisting property.

Next the third technical problem, which this invention is to solve, and a second embodiment, which is concrete means for solving it, will be explained.

Figure 21:
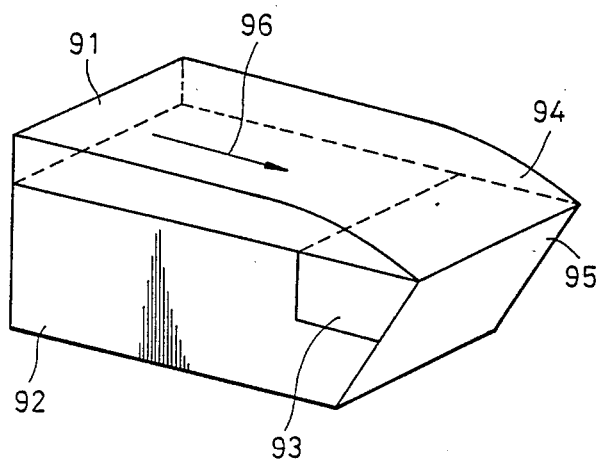
FIG. 21 shows concretely another second embodiment representing means for the third problem, which this invention is to solve.

FIG. 21 is a perspective scheme illustrating the construction, which is an embodiment of the optical waveguide according to this invention. In the figure, reference numeral 91 is a tapered waveguide layer; reference numeral 92 is a substrate having a plane surface for forming the waveguide and a refractive index smaller than that of the waveguide, which is transparent with respect to the guided light; and reference numeral 93 is an impurity diffusion region, in which impurity is diffused in a predetermined region of the substrate 92 so as to make the refractive index thereof different from that of the substrate 92, the substrate 92 outside of the impurity diffusion region 93 being a propagatoin substrate, the latter serving as the emission substrate. Further reference numeral 94 is a tapered region of the waveguide layer 91; reference numeral 95 represents an end surface of the emission substrate 93; and reference numeral 96 indicates a guided light beam of $TE_0$ mode, which is the fundamental wave in the waveguide.

When a tapered optical waveguide having the construction indicated in FIG. 21 is fabricated, according to this invention, at first a substrate 92 for forming the waveguide layer having a predetermined shape by cutting and polishing a basic material of base plate. Then, impurity is diffused in a predetermined region on the light emitting side of this substrate 92 by the impurity diffusion method such as ion exchange, etc. so as to form an impurity diffusion region (emission substrate) 93 having a refractive index different from those of the other regions.

In this case, since the thickness of the impurity diffusion region (emission substrate) 93 is sufficient, if the light beam emitted from the waveguide layer 91 towards the substrate side can arrive at the emission side end surface 95 (usually about 100 to 500 μm), it can be fabricated by increasing the refractive index by impurity diffusion such as ion exchange, etc. By the impurity diffusion by ion exchange (electric field application type), since the photolithographic technology is used, it is possible to expect to improve the precision and at the same time to reduce the cost with respect to the jointed substrate. In addition, since the shape and the precision of the interface between the substrate 92 and the impurity diffusion region 93 depend on the patterning, it is possible to fabricate also a complicated shape such as a curved surface, etc.

The surface of the substrate 92, in which the impurity diffusion region 93 described above is formed in this way, is mirror-polished and the waveguide layer 91 having the tapered region 94 is formed on this surface by ion plating, by an evaporation method such as PVD, CVD, etc., by the sputtering method, etc.

Figure 22:
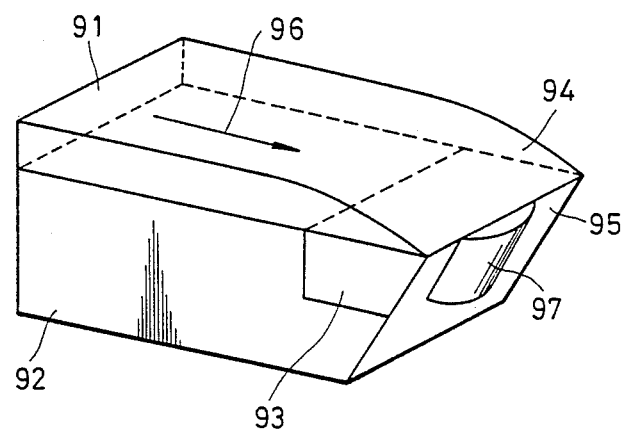
FIG. 22 shows a modification of the embodiment of FIG. 21.

Furthermore it is possible to use the optical waveguide in a waveguide type optical head either by adding a cylindrical lens 97 shown in FIG. 22 to the light emitting end surface 95 of the substrate or by disposing a waveguide lens in either one of the waveguide layers 91 and 94, as described above.

As explained above, according to this invention, since the region 93 having a refractive index different from that of the substrate 92 is formed by the impurity diffusion method and therefore the substrate for forming the optical waveguide, in which the region having a refractive index different from that of the substrate 92 is formed by the impurity diffusion method, is a simple substrate made of a same material so that there exists no joint portion, scattering loss at the joint portion, thermal deformations of the bonding material under a high temperature, variations of the joint portion with the passage of time, etc. produced in the case where a prior art bonded substrate is used, are excluded and the fabrication of the optical waveguide provided with the substrate consisting of regions having different refractive indices is facilitated. Such an optical waveguide can be applied not only to a waveguide type optical head but also to a light integrated circuit.

The embodiments of the invention in which an exclusive property or privilege is claimed are defined as follows:

1. A tapered optical waveguide comprising:
   a substrate having a plane surface for forming a waveguide layer, whose refractive index is higher than that of said substrate, which substrate is transparent with respect to guided light, and
   a waveguide layer formed on said plane surface of said substrate;
   wherein said waveguide layer includes a uniform thickness waveguide layer having a uniform layer thickness and a tapered waveguide disposed contiguously to said uniform thickness waveguide layer so that said guided light propagating in said uniform thickness waveguide layer is emitted there towards said substrate, which tapered waveguide has the same layer thickness as said uniform thickness waveguide layer at a joint therebetween and has a thickness which decreases gradually with increasing distance from said joint;
   wherein said substrate includes a propagation substrate and an emission substrate having a common plane surface for forming said waveguide layer and disposed in the order described above in the waveguide direction within said waveguide layer, a refractive index of said emission substrate being greater than that of said propagation substrate; and
   wherein a joint portion between said propagation substrate and said emission substrate is located so that it is close to an emission starting position determined by the refractive indices of said propagation substrate and said waveguide layer as well as the shape of said tapered optical waveguide and so that it is not beyond said emission starting position in the waveguide direction.

2. A tapered optical waveguide according to claim 1, wherein a free surface of said tapered waveguide layer has a convex shape protruding away from said substrate.

3. A tapered optical waveguide according to claim 1, including an anamorphic lens disposed on a light emitting end surface of said emission substrate.

4. A tapered optical waveguide comprising:
   a substrate having a plane surface for forming a waveguide layer, whose refractive index is higher than that of said substrate, which substrate is transparent with respect to guided light;
   a waveguide layer formed on said plane surface of said substrate; and
   a clad layer buried in said substrate under said plane surface;
   wherein said waveguide layer includes a uniform thickness waveguide layer having a uniform layer thickness and a tapered waveguide disposed contiguously to said uniform thickness waveguide layer so that said guided light propagating in said uniform thickness waveguide layer is emitted there toward said substrate, which tapered waveguide has the same layer thickness as said uniform thickness waveguide layer at a joint therebetween and has a thickness which descreases gradually with increasing distance from said joint; and
   wherein said clad layer has a refractive index smaller than that of said substrate and is so located that it includes an emission starting position determined by the refractive indices of said substrate and said waveguide layer as well as the shape of said tapered optical waveguide.

5. A tapered optical waveguide according to claim 4, wherein a free surface of said tapered waveguide layer has a convex shape protruding away from said substrate.

6. A tapered optical waveguide according to claim 4, including an anamorphic lens disposed on a light emitting end surface of said substrate.

7. A waveguide type optical head, comprising:
   a substrate having a plane surface for forming a waveguide layer, whose refractive index is higher than that of said substrate, which substrate is transparent with respect to guided light, and
   a waveguide layer formed on said plane surface of said substrate;
   wherein said waveguide layer includes a uniform thickness waveguide layer having a uniform layer thickness and a tapered waveguide disposed contiguously to said uniform thickness waveguide layer, forming a joint portion therebetween, so that said guided light propagating in a propagation direction in said uniform thickness waveguide layer is emitted there towards said substrate, which tapered waveguided has the same layer thickness as said uniform thickness waveguide layer at said joint portion and has a thickness which descreases gradually with increasing distance from said joint portion;

wherein said waveguide layer is provided with a lens having a converging action in the width direction of said waveguide layer and constructed so as to converge the emitted light beam emitted by said tapered waveguide layer towards the substrate side to form a small spot on an optical disc; and wherein said substrate includes a propagation substrate and an emission substrate each having thereon a portion of said plane surface for forming the waveguide layer, said propagation substrate and said emission substrate being disposed so as to be contiguous to each other in the propagation direction, said emission substrate having a refractive index greater than that of said propagation substrate, and a joint portion between said propagation substrate and said emission substrate being located so that it is close to an emission starting position determined by the refractive indices of said propagation substrate and said waveguide layer as well as the shape of said tapered optical waveguide and so that it is not beyond said emission starting position in the waveguide direction.

8. A waveguide type optical head according to claim 7, wherein a free surface of said tapered waveguide layer has a convex shape protruding away from said substrate.

9. A waveguide type optical head comprising:
a substrate having a plane surface for forming a waveguide layer, whose refractive index is higher than that of said substrate, which substrate is transparent with respect to guided light;
a waveguide layer formed on said plane surface of said substrate; and
a clad layer buried in said substrate under said plane surface;
wherein said waveguide layer includes a uniform thickness waveguide layer haing a uniform layer thickness and a tapered waveguide disposed contiguously to said uniform thickness waveguide layer, forming a joint portion therebetween, so that said guided light propagating in said uniform thickness waveguide layer is emitted there towards said substrate, which tapered waveguide has the same layer thickness as said uniform thickness waveguide layer at said joint portion and has a thickness which decreases gradually with increasing distance from said joint portion;
wherein said clad layer has a refractive index smaller than that of said substrate and is so located that it includes an emission starting position determined by the refractive indices of said propagation substrate and said waveguide layer as well as the shape of said tapered optical waveguide; and
wherein said waveguide layer is provided with a lens having a converging action in the width direction of said waveguide layer and constructed so as to converge the emitted light beam emitted by said tapered waveguide layer towards the substrate side to form a small spot on an optical disc.

10. A waveguide type optical head according to claim 9, wherein a free surface of said tapered waveguide layer has a convex shape protruding away from said substrate.

11. An optical waveguide comprising:
at least two substrates, which are a first and a second substrate; and
a waveguide layer;
wherein both of said substrates have refractive indices smaller than that of said waveguide layer, are transparent with respect of light, are disposed so as to be contiguous to each other and are fusion-bonded with each other, said first and said second substrates having a plane surface in common for forming the waveguide layer, said waveguide layer being formed on said plane surface.

12. An optical waveguide according to claim 11, wherein said waveguide layer includes a uniform thickness waveguide layer having a uniform layer thicknes and a tapered waveguide disposed contiguously to said uniform thickness waveguide layer, forming a joint portion therebetween, so that guided light propagating in said uniform thickness waveguide layer is emitted there towards said substrate, which tapered waveguide has the same layer thickness as said uniform thickness which decreases gradually with increasing distance from said joint portion; wherein said substrate, on which said waveguide layer is formed, includes a propagation substrate which is said first substrate and an emission substrate which is said second substrate, said propagation and emission substrates having a common plane surface for forming said waveguide layer and being disposed in the order described above in the waveguide direction within said waveguide layer; and wherein a joint portion between said propagation substrate and said emission substrate is located so that it is close to an emission starting position determined by the refractive indices of said propagation substrate and said waveguide layer as well as the shape of said tapered optical waveguide and so that it is not beyond said emission starting position in the waveguide direction.

13. An optical waveguide comprising:
a substrate;
a waveguide layer, said substrate having a plane surface for forming the waveguide layer and a refractive index smaller than that of the waveguide layer, said substrate being transparent with respect to light guided in said waveguide layer; and
an impurity diffusion region formed by diffusing impurity in a predetermined region of said substrate so that said region has a refractive index different from that of an adjacent region of said substrate, said waveguide layer formed on said substrate including a portion on said impurity diffusion region.

14. A tapered optical waveguide according to claim 13, wherein said waveguide layer includes a uniform thickness waveguide layer having a uniform layer thickness and a tapered waveguide disposed contiguously to said uniform thickness waveguide layer, and forming a joint portion therebetween, so that light propagating in said uniform thickness waveguide layer is emitted there towards said substrate, which tapered waveguide has the same layer thickness as said uniform thickness waveguide layer at said joint portion and has a thickness which decreases gradually with increasing distance from said joint portion; wherein said substrate on which said waveguide layer is formed includes a propagation substrate and an emission substrate which are respectively said adjacent and impurity diffusion regions of said substrate, which have a common plane surface for forming said waveguide layer and which are disposed in the order described above in the waveguide direction within said waveguide layer; and wherein a joint portion between said propagation substrate and said emission substrate is located so that it is close to an emission starting position determined by the refractive indices of said propagation substrate and said waveguide layer as well as the shape of said tapered optical waveguide and so that it is not beyond said emission starting position in the waveguide direction.

* * * * *

UNITED STATES PATENT AND TRADEMARK OFFICE
CERTIFICATE OF CORRECTION

PATENT NO. : 4 943 129
DATED      : July 24, 1990
INVENTOR(S): Tadashi TAKEDA et al It is certified that error appears in the above-identified patent and that said Letters Patent is hereby corrected as shown below:

Column 18, line 37; change "descreases" to ---decreases---.
          line 67; change "waveguided" to ---waveguide---.
Column 19, line 38; change "haing" to ---having---.
Column 20, line  1; change "of" to ---to---.
          line 14; after "thickness" insert ---waveguide layer at said joint portion and has a thickness---.

Signed and Sealed this

Seventeenth Day of December, 1991

Attest:

HARRY F. MANBECK, JR.

Attesting Officer

Commissioner of Patents and Trademarks